H. DUNCAN.
VEHICLE WHEEL.
APPLICATION FILED JUNE 26, 1911.
1,013,282.
Patented Jan. 2, 1912.
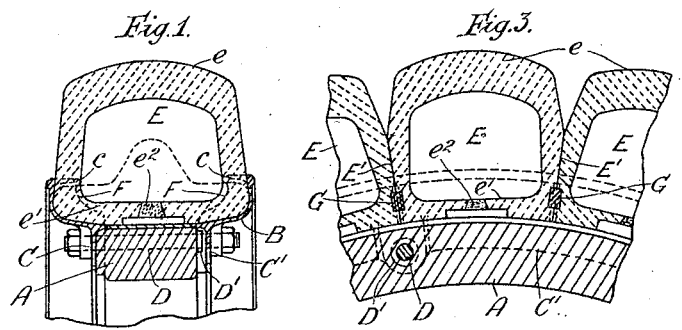
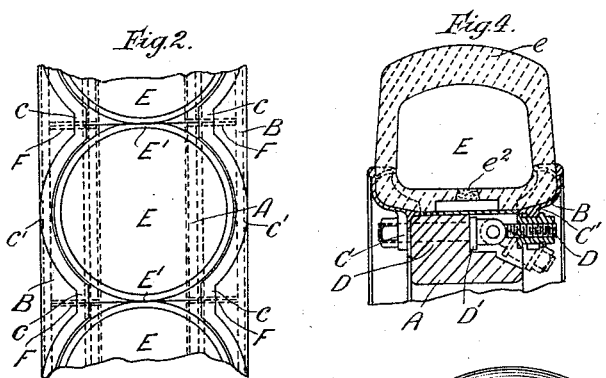
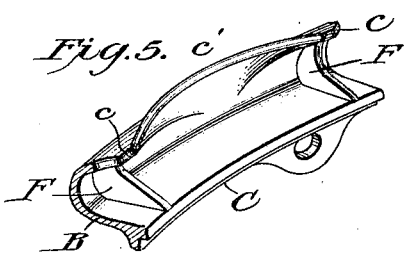
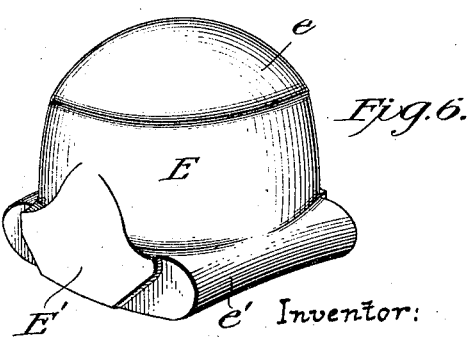
Witnesses:
Inventor:

UNITED STATES PATENT OFFICE.

HUGH DUNCAN, OF LANGSIDE, GLASGOW, SCOTLAND.

VEHICLE-WHEEL.

1,013,282.	Specification of Letters Patent.	Patented Jan. 2, 1912.

Application filed June 26, 1911. Serial No. 635,281.

*To all whom it may concern:*

Be it known that I, HUGH DUNCAN, a subject of the King of the United Kingdom of Great Britain and Ireland, and residing at Langside, Glasgow, Scotland, have invented a certain new and useful Improvement in Vehicle-Wheels, of which the following is a specification.

This invention relates to vehicle wheels in which the wheel rim is provided with detachable flanges and a tire made up of a plurality of resilient tread sections held together by the flanges.

The invention has for its objects to provide an improved construction whereby the tread sections are detachably but securely clamped in place upon the wheel rim without possibility of accidental displacement, and also to provide improved securing means adapted to permit the engagement of the tread sections with one another while preventing creeping of said sections upon the rim.

These and other objects of the invention, together with means whereby the same may be carried into effect, will best be understood from the following description of certain forms or embodiments thereof illustrated in the accompanying drawings, in which—

Figure 1 is a cross section of the improved wheel rim and tire; Fig. 2 is a plan, Fig. 3 is a longitudinal section and Fig. 4 is a view corresponding to Fig. 1 but showing a variation in the form of the bolts employed for securing the flange members to the rim. Fig. 5 is a detail perspective view of a portion of one of the side flange members detached. Fig. 6 is a perspective view of one of the resilent tread sections removed from the rim.

As shown, the felly A of the wheel is shod with a metal rim $A^1$ having on each side a flange member C and $C^1$ secured by bolts D. One of the flange members, e. g., the member C, is preferably permanently secured to the felly, its removal only being required in exceptional circumstances, the bolts being for this purpose fitted with nuts at each end and each having a ruff $D^1$ bearing on one side of the felly. The other flange member $C^1$ is held in place by a nut on the extension of each bolt beyond the ruff, so that it is readily detachable. As shown in Fig. 4 the bolt D is provided with an extension $D^2$ hinged or pivoted thereto at $D^3$ in order to facilitate removal of the flange member $C^1$ without disturbing the member C. The flange members C and $C^1$ when in place detachably secure to the wheel rim $A^1$ the resilient tread sections designated as a whole by E.

The resilient tread sections each comprise a body portion, preferably of substantially cylindrical form, having a base $e^1$, preferably of substantially rectangular form having corners projecting beyond the body portion. The tread sections are hollow and are inflated preferably by means of a needle inflator passed through self-closing or spongy rubber $e^2$ in the base. The tread sections are arranged upon the rim with their body portions substantially in engagement with one another, as at $E^1$, so that any shock imparted to the individual sections in running over rough or uneven roads will be transmitted around the tire and absorbed by the tire as a whole.

Each of the flange members C and $C^1$ is formed with an outwardly turned portion B and with an inturned lip arranged to engage the projecting bases of the several tread sections and clamp the same securely and immovably in place upon the rim. Said lips are extended, as at c, part way between the body portions of the tread sections, to clamp the bases as above described and to prevent creeping of the sections on the rim while permitting their engagement at $E^1$, and are recessed, as at $c^1$, to receive said body portions. The flange members are preferably further provided with ribs F connecting the outwardly turned portions B with the extended portions c of the lips and extending part way between the bases of the tread sections. The outwardly turned portions, lips, and ribs form pockets in which the corners of said bases are received, so that the tread sections are firmly held against movement in any direction.

The flange members when on the wheel while continuous in their length form an interrupted channel which is narrower at the outer periphery than at the base, a wedge-shaped grip being thus formed so that the tread sections are held securely by their bases with the least possible strain on the bolts, and the sections are held securely on the rim without screwing the flanges hard upon them, whereby the resiliency of the tire is insured. When the tread sections are on the ground, their compression tightens them sufficiently within the flanges to withstand the duty required. Grooves G may be formed between the several sections and filled e. g. with slips of wood to prevent any lifting of the sections, more particularly in the case of wheels for heavy vehicles.

Having now described my invention what I claim and desire to secure by Letters Patent of the United States is:—

1. In a vehicle wheel, in combination, a rim, a tread consisting of a series of resilient sections supported on said rim, said sections each comprising a body portion and a base extending beyond said body portion, and flange members detachably securing said tread sections to said rim, said members having ribs, extending between the bases of said tread sections, and inturned lips engaging said bases and clamping the same immovably to said rim and extending part way between the body portions of said sections, said lips being recessed to receive said body portions.

2. In a vehicle wheel, in combination, a rim, a tread consisting of a series of resilient sections supported on said rim, said sections each comprising a substantially cylindrical body portion and a substantially rectangular base having corners extending beyond said body portion, and flange members detachably securing said tread sections to said rim, said members having outwardly turned portions supporting the outer edges of the bases of said sections, inturned lips extending part way between the body portions of said sections and recessed to receive the said body portions, and ribs connecting said outwardly turned portions and lips and extending between said bases, said outwardly turned portions, lips, and ribs forming pockets, in which the corners of said bases are received.

3. In a vehicle wheel, in combination, a rim, flange members detachably secured to said rim, said flange members having formed integral therewith spaced, oppositely-disposed, inwardly-extending lips or projections and inwardly extending ribs beneath said lips or projections, the ribs affording, in conjunction with the rim and the bodies of the flange members, pockets of approximately rectangular shape, and resilient tread sections having correspondingly shaped bases fitted in said pockets, said tread sections being held between the said flange members and engaged by said projections, the meeting edges of said tread sections being in engagement with one another in line with oppositely disposed ribs.

In testimony whereof I have signed my name to this specification in the presence of two subscribing witnesses.

HUGH DUNCAN.

Witnesses:
WALLACE CRANSTON FAIRWEATHER,
JOHN McCLEARY.